(12) United States Patent
Herrmann et al.

(10) Patent No.: US 8,876,048 B2
(45) Date of Patent: Nov. 4, 2014

(54) FUSELAGE OF AN AIRCRAFT OR SPACECRAFT AND CORRESPONDING AIRCRAFT OR SPACECRAFT

(75) Inventors: Ralf Herrmann, Ganderkesee (DE); Paul Joern, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 1008 days.

(21) Appl. No.: 12/528,381

(22) PCT Filed: Feb. 21, 2008

(86) PCT No.: PCT/EP2008/052118
§ 371 (c)(1),
(2), (4) Date: Sep. 27, 2010

(87) PCT Pub. No.: WO2008/101984
PCT Pub. Date: Aug. 28, 2008

(65) Prior Publication Data
US 2011/0006159 A1 Jan. 13, 2011

Related U.S. Application Data

(60) Provisional application No. 60/903,035, filed on Feb. 23, 2007.

(30) Foreign Application Priority Data

Feb. 23, 2007 (DE) .......................... 10 2007 008 988

(51) Int. Cl.
*B64C 1/00* (2006.01)
*B64C 1/40* (2006.01)
*B64C 1/06* (2006.01)

(52) U.S. Cl.
CPC ................. *B64C 1/066* (2013.01); *Y02T 50/46* (2013.01); *B64C 1/067* (2013.01)
USPC ........................................ 244/119; 244/171.8

(58) Field of Classification Search
CPC ........... B64C 1/066; B64C 1/067; B64G 1/50
USPC ............................... 454/71, 72, 73, 74, 76, 77
See application file for complete search history.

(56) References Cited

U.S. PATENT DOCUMENTS 2,160,066 A * 5/1939 Frische .......................... 52/407.1
2,427,698 A * 9/1947 Arnhym .......................... 454/185

(Continued)

FOREIGN PATENT DOCUMENTS

DE 10154063 A1 5/2003
DE 102007003278 7/2008

(Continued)

OTHER PUBLICATIONS

German Office Action from DE 2007 008 988.2 dated Mar. 13, 2012.

(Continued)

*Primary Examiner* — Brian M O'Hara
(74) *Attorney, Agent, or Firm* — Jenkins, Wilson, Taylor & Hunt, P.A.

(57) ABSTRACT

The invention relates to a fuselage of an air- or spacecraft. The fuselage comprises at least one shell element and one insulation element. The insulation element is configured as a passive, watertight insulation element and can be mounted on an inner side in a completely air- and watertight manner. The invention furthermore relates to a respective aircraft or spacecraft.

10 Claims, 4 Drawing Sheets

(56) References Cited

U.S. PATENT DOCUMENTS

| | | | |
|---|---|---|---|
| 3,697,728 A | 10/1972 | Stirzenbecher | |
| 4,291,851 A | 9/1981 | Johnson | |
| 5,472,760 A | 12/1995 | Norvell | |
| 5,788,184 A * | 8/1998 | Eddy | 244/121 |
| 5,811,167 A | 9/1998 | Norvell | |
| 6,491,254 B1 | 12/2002 | Walkinshaw et al. | |
| 7,005,175 B2 | 2/2006 | Hachenberg et al. | |
| 7,040,575 B2 | 5/2006 | Struve et al. | |
| 2003/0087049 A1 | 5/2003 | Hachenberg et al. | |
| 2010/0038487 A1 | 2/2010 | Kolax et al. | |

FOREIGN PATENT DOCUMENTS

| | | |
|---|---|---|
| EP | 0435 650 A1 | 7/1991 |
| JP | 48-04001 | 2/1973 |
| JP | 56-18820 | 1/1981 |
| JP | 07-041296 | 2/1995 |
| JP | 2003/191897 | 7/2003 |
| JP | 2007/530367 | 11/2007 |
| RU | 8098 | 10/1998 |
| SU | 183593 | 1/1969 |
| SU | 1839976 | 6/2006 |
| WO | WO 97/16303 A1 | 5/1997 |
| WO | WO 00/37313 | 6/2000 |
| WO | WO 2005/095206 | 10/2005 |
| WO | WO 2008/101984 | 8/2008 |
| WO | WO 2008/101986 | 8/2008 |

OTHER PUBLICATIONS

Chinese Office Action (English translation) for CN No. 200880005273.8 dated Jan. 9, 2012.
German Office Action from DE 2007 008 988.2 dated Oct. 30, 2008.
International Search Report and Written Opinion for EP 2008/052118 dated May 23, 2008.
Russian Grant Decision for Application Serial No. 2009/130568/11 dated Feb. 21, 2008.
Non-Final Office Action for U.S. Appl. No. 12/528,381 dated Aug. 28, 2012.
Japanese Office Action for Serial No. 2009/550709 dated Nov. 6, 2012.

* cited by examiner

FUSELAGE OF AN AIRCRAFT OR SPACECRAFT AND CORRESPONDING AIRCRAFT OR SPACECRAFT

CROSS-REFERENCE TO RELATED APPLICATIONS

This application claims the benefit of U.S. Provisional Application No. 60/903,035, filed Feb. 23, 2007 and German patent application No. 10 2007 008 988.2, filed Feb. 23, 2007, the entire disclosures of which are herein incorporated by reference.

The present invention relates to a fuselage of an aircraft or spacecraft and to a corresponding aircraft or spacecraft.

Such fuselages are assembled from several components. An aircraft like e.g. an airplane is not only exposed to substantial load cycles and loads during operation, but also to substantial temperature differences. Thus, the exterior temperature on the outside of the fuselage can be approximately −55° C. at a certain cruise altitude, while the interior temperature in the portion of cabins is approximately +20° C. Therefore, thermal insulation is provided on the inside of a conventional is airplane fuselage, which also forms an acoustic insulation.

A fuselage can be provided with one or several shells, in particular with two shells.

FIG. 3 illustrates a partial sectional view of a single shell fuselage 1, employing a technique known to the applicant, having a shell element 2, comprising stiffeners 17 at its inner side 9, e.g. so-called stringers. The conventional construction of an insulation 20 comprises insulation layers, typically made of glass wool and integrated in a liner 19, e.g. a plastic foil, between the inner side 9 of the shell element 2, and an inner fairing 10 of the cabin. The fairing 10 is mounted e.g. to bulkheads 15 and e.g. made of fiber glass composite material. It can also comprise side panels 18. This assembly fulfills the function of heat insulation and sound insulation of an interior space 22 relative to an exterior space 21 outside of the fuselage 1.

Perceived disadvantages of this setup, however, are the additional weight of the insulation, its space requirement, and the required assembly effort. Furthermore, an accumulation of condensation water can lead to increased weight and to a potential for corrosion in this assembly, which necessitates corresponding maintenance requirements. As a disadvantage, removal of the moisture accumulation through drying and/or replacing the insulation 20 is necessary.

Therefore, concepts were proposed as described e.g. in DE 101 54 063, which provide a fuselage with a double shell structure. FIG. 4 thus shows a partial sectional view of a section of a double shell fuselage according to the state of the art, which is e.g. made of fiber reinforced materials.

The shell element 2 of the fuselage 1 comprises an outer shell 3 and an inner shell 4, which are disposed at a distance from each other, forming a core cavity 7. The core cavity 7 is provided with a core structure 8, which comprises e.g. a folded honeycomb structure made of glass fiber reinforced plastic, carbon fiber reinforced plastics or similar, transfers forces and moments, and stabilizes the fuselage structure. Simultaneously the core structure 8 provides thermal and acoustic insulation and increases the interior cavity of the cabin through its compactness. The core cavity 7 can be vented, which is indicated by arrows for an air inflow 12 and an air outflow 13, which enables so-called humidity management with respect to condensation in the core cavity 7. The inner shell 5 faces the interior cavity 22 with its inside 9, where the fairing 10, e.g. a decorative foil, is disposed thereon.

Thus another additional insulation effort is disadvantageous, since otherwise the object of a controllable inner wall temperature, e.g. +20° C., cannot be accomplished.

SUMMARY

Based on these facts, it is the object of the present invention to provide a fuselage and a corresponding aircraft or spacecraft, which do not have the above mentioned disadvantages.

According to the invention this object is accomplished by a fuselage, having the features of patent claim 1, or by an aircraft or spacecraft with the features of patent claim 9.

Accordingly, a fuselage of an aircraft or spacecraft is provided, having at least one shell element and an insulation element, which are characterized in that the insulation element is provided as a passive watertight insulation element and can be applied to the inside of the at least one shell element in a completely air- and watertight manner.

Thus, the present invention has the advantage that the insulation requires less installation space compared to the state of the art. Furthermore, weight is also reduced compared to the state of the art. Between the insulation element and the shell element, no intermediary cavity exists, due to the completely air- and watertight application, e.g. gluing, whereby, on the one hand, the thermal insulation is improved, and, on the other hand, no possibility for moisture accumulation and corrosion exists.

Since the insulation element can be provided watertight, and in a preferred embodiment also air- or gastight, there is the additional advantage, that no moisture accumulation and no corrosion potential are possible in the insulation material. The insulation element can e.g. be an insulation material with closed cells. The weight of the aircraft is thus reduced due to the missing weight of the condensate.

The insulation element forms an additional acoustic insulation. When the materials are selected in a suitable manner, improved FST properties (fire smoke toxicity properties) are assured.

The use of VIP (vacuum insulation panel) technology for the insulation element provides particular advantages, since all the above described advantages can be achieved.

Advantageous embodiments and improvements of the present invention can be found in the dependent claims.

The insulation element can be configured, so that the dew point of water is positioned within the insulation material, wherein a condensation of water in the cabin is avoided. Such dew point optimized insulation is advantageous in particular for double shell fuselage structures, since the double shell fuselage already takes over a large portion of the insulation effect and only a small portion of secondary insulation is necessary.

In a multi-shell fuselage, e.g. with an outer shell element and at least one inner shell element, a core cavity can be formed by them and can be heated by an airflow for an active insulation. Thereby it is facilitated that the insulation element can be used with a small size and thus more cabin space is created. The weight is thus also reduced.

Another advantage of a double shell fuselage with such an insulation can be the larger bulkhead distance and a construction without stringers, so that the insulation element, e.g. in the form of multiple single insulation elements, can be glued directly to the fuselage structure in an air- and watertight manner much more easily than in a conventional fuselage with bulkheads and stringers (re. FIG. 3).

For an additional reduction of the insulation thickness, or improvement of the thermal insulation, it is possible to dispose the fairing at a distance from the insulation element, wherein an intermediary space is formed, which can be heated by an additional airflow for an active insulation.

Accordingly an aircraft or spacecraft is provided, which is configured with a fuselage as described above.

BRIEF DESCRIPTION OF THE DRAWINGS

The invention is subsequently described in more detail with reference to an embodiment illustrated in the schematic figures of the drawing. It is shown in.

DETAILED DESCRIPTION OF THE DRAWINGS

Figure 1:
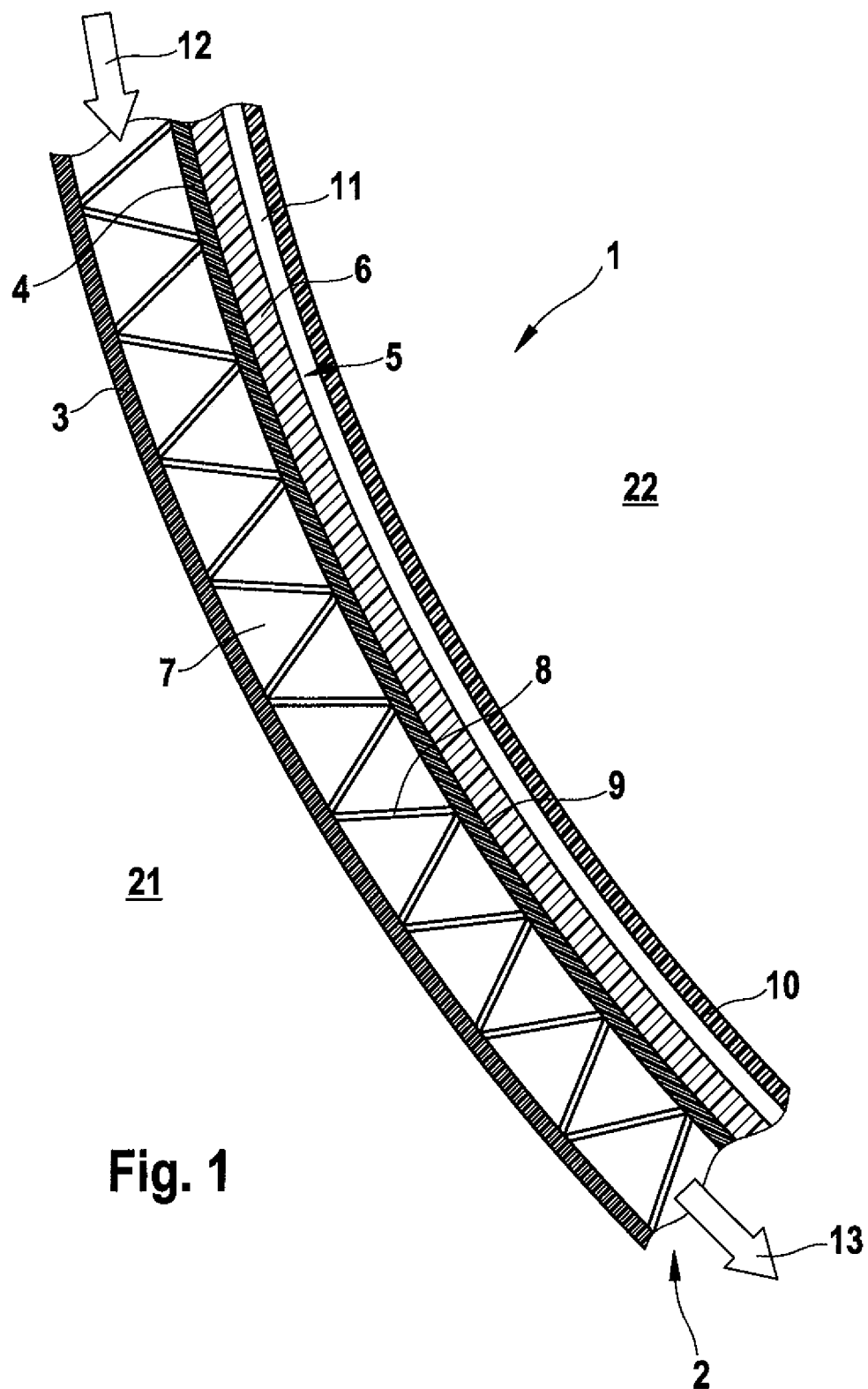
FIG. 1 a partial sectional view of a section of a fuselage according to a first embodiment of the invention.

In all figures of the drawing, identical or functionally identical elements are designated with the same numerals, unless stated otherwise.

Figure 3:
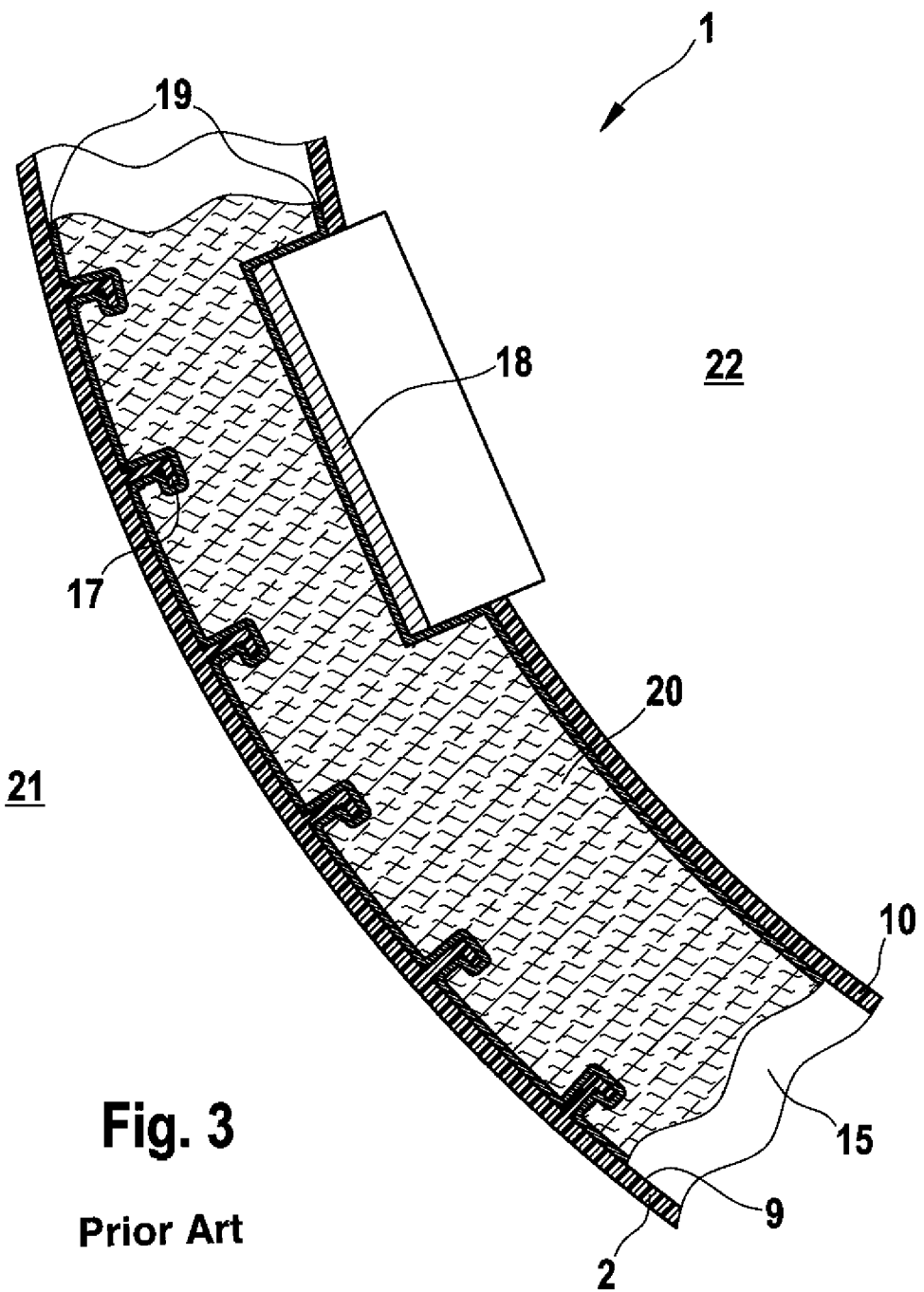
FIG. 3 a partial sectional view of a section of a single shell fuselage according to the state of the art.
Figure 4:
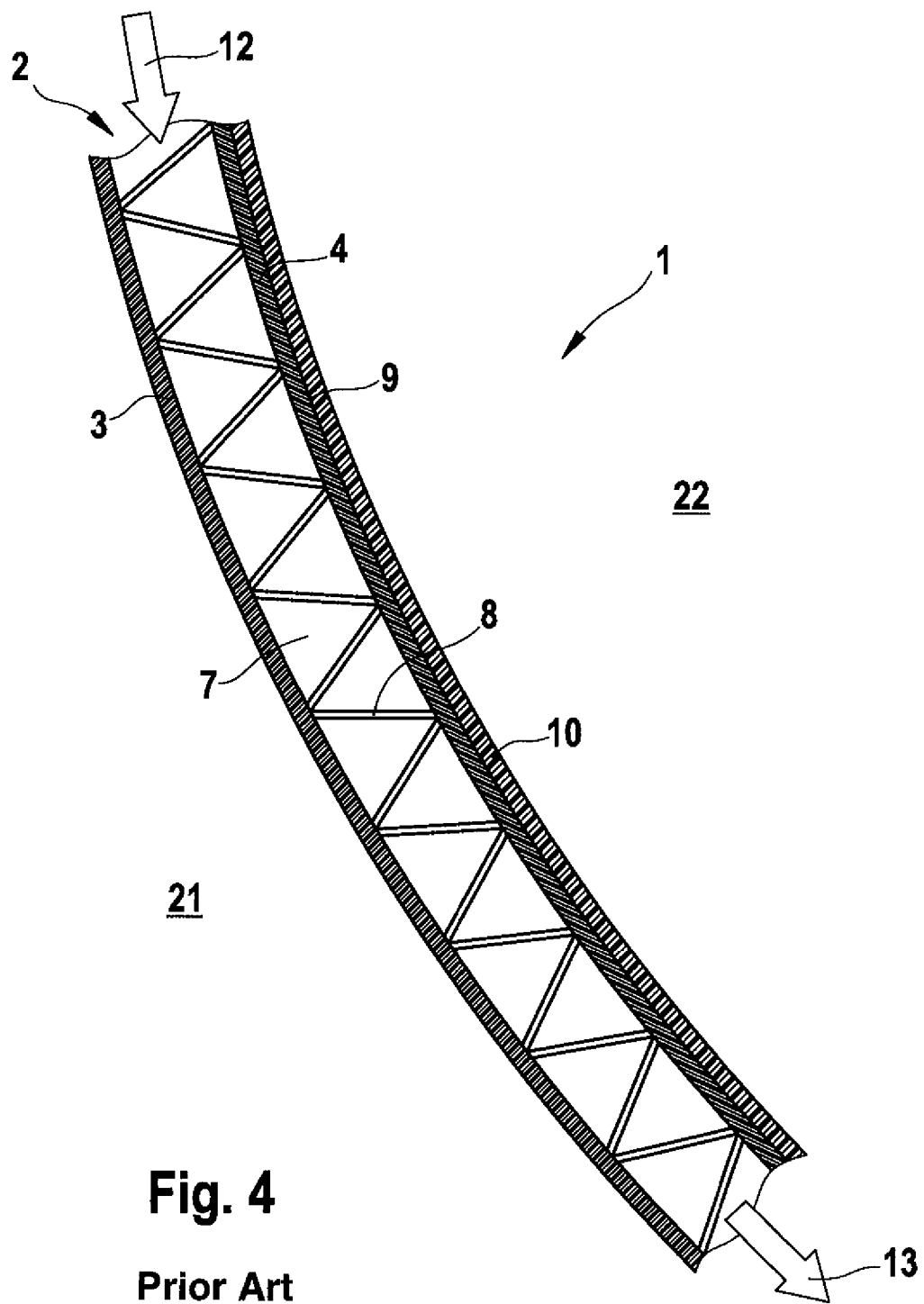
FIG. 4 a partial sectional view of a section of a double shell fuselage according to the state of the art.

The state of the art illustrated in FIGS. 3 and 4 has already been described above.

FIG. 1 shows a partial sectional view of a section of a fuselage 1 in multi-shell construction according to a first embodiment of the invention.

The multi-shell construction of the fuselage 1 is configured with a double wall shell element 2 in this embodiment. An outer shell 3 is disposed with one side towards an outside space 21 of an aircraft, which is not shown. Its opposite side is disposed at a distance from one side of an inner shell 4, wherein a core cavity 7 is formed, in which a core assembly 8 is disposed. The core assembly 8 connects the outer shell 3 with the inner shell 4 in a form locked manner and comprises insulation properties for thermal and sound insulation towards an interior space 22, e.g. a cabin of an aircraft.

An inner shell 9 of the shell element 2, in this example an inner side 9 of the inner shell 4, is provided with an insulation element 5, which is glued onto it completely air- and watertight. The insulation element 5 comprises an insulating structural material 6. It can e.g. be a closed cell insulation material, or a vacuum insulation panel (VIP).

The insulation element 5 thus forms a passive insulation in this exemplary embodiment.

In addition to this passive insulation, an active insulation is possible in this example, which is subsequently described in more detail.

A fairing 10 is disposed in front of the insulation element 5 towards the interior space 22. Said fairing forms an intermediary space 11 together with the insulation 5 in this embodiment.

The core cavity 7 is configured, so that it can be vented and flowed by an air- or gas flow. The arrows 12 and 13 indicate an air inflow and an air outflow in an exemplary manner. The airflow is heated in a manner, which is not illustrated, and imparts its energy to the core cavity 7, wherein an active insulation is formed. In such a case, the thickness of the insulation element 5 can be reduced, wherein the inner cavity 22 is enlarged, which generates weight savings.

Additionally, it is facilitated that the airflow also flows through the intermediary cavity 11 as it is appreciated by a person skilled in the art. Thus, it can be possible that also the fairing 10 has an insulating effect, so that a reduced thickness of insulation element 5 and fairing 10 can be advantageously obtained.

Figure 2:
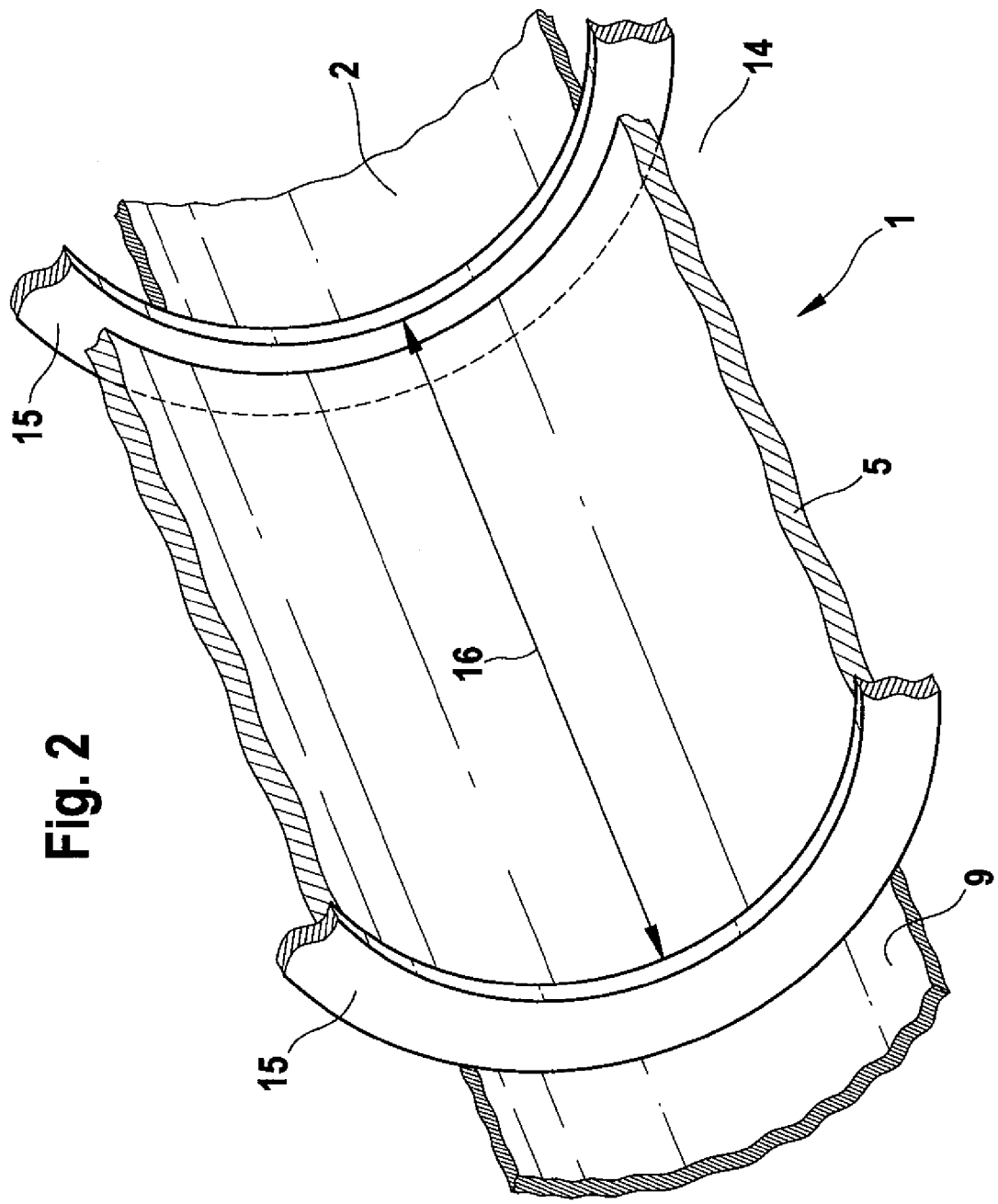
FIG. 2 a partial sectional view of a section of a fuselage according to a second embodiment of the invention.

In a multi-shell fuselage 1 with a fiber reinforced fuselage structure, like e.g. in a double shell fuselage 1 according to FIG. 1, the use of the insulation element 5 is advantageous in particular. This is the case in particular in the embodiment illustrated in FIG. 2, where the fuselage structure does not comprise stringers, and a large bulkhead distance 16 exists between the bulkheads 15.

The shell element 2 is shown here with its outer shell, wherein an insulation element 5 is disposed in a bulkhead gap 14. As described above, it is glued air- and watertight onto the inside 9 of the shell element 2. The bulkheads 15 are only illustrated in principle.

The insulation element 5 can also be used advantageously with one shell fuselage. The insulation element 5 can be comprised of several single elements, which is not shown, but appreciated by a person skilled in the art.

The invention is not restricted to the above described embodiments.

The insulation element 5 is preferably configured in a dew point optimized manner. This means that the dew point of water or the conditions for this dew point only occur within the insulation element 5 and not within the inner cavity 22. Thus, a condensation of water in the cabin is avoided.

LIST OF REFERENCE NUMERALS 1 fuselage
2 shell element
3 outer shell
4 inner shell
5 insulation element
6 structural material
7 core cavity
8 core assembly
9 inner side
10 fairing
11 intermediary space
12 air inflow
13 air outflow
14 bulkhead gap
15 bulkhead
16 bulkhead distance
17 stiffener
18 side panel
19 liner
20 insulation
21 exterior space
22 interior space

What is claimed is:

1. A fuselage for an aircraft or spacecraft, comprising at least one shell element and one insulation element,
   wherein the fuselage defines an interior space of the aircraft or spacecraft,
   wherein the shell element is configured with multiple shells and comprises an outer shell element and an inner shell element defining a core cavity in which a core assembly is disposed, wherein the core assembly extends around a circumference of the fuselage and which extends between the outer shell element and the inner shell element to connect the outer shell element with the inner shell element, wherein the core cavity is both heated and ventilated by an airflow that moves in a circumferential direction of the fuselage for an active insulation, wherein the insulation element is configured as a passive, watertight insulation element, and is mounted on an inner side of the inner shell element in a completely air and watertight manner, the inner side of the inner shell element facing toward the interior space, and wherein a fairing is disposed at a distance toward the interior space from the insulation element for forming an intermediary space and is heated by an additional airflow for active insulation.

2. The fuselage according to claim 1, wherein the insulation element is configured, so that the dew point of water is positioned within the insulation element.

3. The fuselage according to claim 1, wherein the insulation element is at least one of airtight, gastight or watertight.

4. The fuselage according to claim 1, wherein the insulation element is a closed cell insulation material.

5. The fuselage according to claim 1, wherein the insulation element is manufactured using the VIP technology.

6. The fuselage according to claim 1, wherein the insulation element is configured from a plurality of single elements.

7. The fuselage according to claim 1, wherein the fairing comprises heat and sound insulating properties.

8. The fuselage according to claim 1, wherein the insulation element comprises a material with advantageous FST properties.

9. An aircraft or spacecraft having a fuselage configured according to claim 1.

10. The fuselage according to claim 1, wherein the core assembly connects the outer shell element with the inner shell element in a form locked manner and comprises insulation properties for at least one of thermal insulation and sound insulation.

* * * * *